(12) United States Patent
Minamitani et al.

(10) Patent No.: US 8,433,502 B2
(45) Date of Patent: Apr. 30, 2013

(54) CONTROL METHOD AND CONTROL DEVICE FOR ENGINE

(75) Inventors: Kunitomo Minamitani, Kure (JP);
Katsumasa Yoshida, Higashihiroshima (JP); Seiyo Hirano, Aki-gun (JP); Akitomo Kume, Hiroshima (JP); Hideki Sanai, Higashihiroshima (JP); Kazuya Kotani, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 510 days.

(21) Appl. No.: 12/836,521

(22) Filed: Jul. 14, 2010

(65) Prior Publication Data

US 2011/0029221 A1 Feb. 3, 2011

(30) Foreign Application Priority Data

Jul. 29, 2009 (JP) ................................ 2009-176184

(51) Int. Cl.
*F02D 29/02* (2006.01)
*F02D 28/00* (2006.01)
*F02N 11/08* (2006.01)
*G06F 19/00* (2011.01)

(52) U.S. Cl.
USPC ...................................... 701/112; 123/179.4

(58) Field of Classification Search .................. 701/112, 701/113; 123/179.4, 179.5, 352
See application file for complete search history.

(56) References Cited

U.S. PATENT DOCUMENTS 4,364,343 A 12/1982 Malik
6,466,860 B2 * 10/2002 Kaneko ......................... 701/112
6,942,594 B2 * 9/2005 Itoh et al. ............................ 477/3
8,246,517 B2 * 8/2012 Senda et al. .................... 477/121
2011/0202254 A1 * 8/2011 Ishikawa et al. .............. 701/103
2012/0312269 A1 * 12/2012 Fujiwara et al. ........... 123/179.4

FOREIGN PATENT DOCUMENTS

| JP | 2000-283010 A | 10/2000 |
|---|---|---|
| JP | 2001-304007 A | 10/2001 |
| JP | 2004-108327 | 4/2004 |
| WO | 2004067949 A1 | 8/2004 |
| WO | 2006054734 A1 | 5/2006 |

OTHER PUBLICATIONS

European Patent Office, Search Report of EP 10 00 7591, Nov. 9, 2010, 5 pages.

* cited by examiner

*Primary Examiner* — Hieu T Vo
(74) *Attorney, Agent, or Firm* — Alleman Hall McCoy Russell & Tuttle LLP (57) ABSTRACT

One example method for an engine having an automatic stopping function in which the engine is automatically stopped when a predetermined engine stopping condition is satisfied, and then the engine is automatically restarted when a predetermined engine restarting condition is satisfied, includes the following: a first step for driving a motor so as to increase an engine rotating speed of the engine up to a predetermined rotating speed and maintain the engine rotating speed, in a case in which a predetermined first condition is satisfied when the engine rotating speed is below the predetermined rotating speed during automatic engine stopping; and a second step for restarting a fuel supply into the engine in a case in which a predetermined second condition is satisfied after the first step is executed.

12 Claims, 8 Drawing Sheets

CONTROL METHOD AND CONTROL DEVICE FOR ENGINE

FIELD OF THE INVENTION

This invention relates to a control method and a control device for an engine having an automatic engine stopping function, wherein the engine is automatically stopped when a predetermined engine stopping condition is satisfied, and then the engine is automatically restarted when a predetermined engine restarting condition is satisfied.

BACKGROUND OF THE INVENTION

During vehicle driving (including vehicle stopping), an engine commonly runs in an idling condition when there is no need to produce driving power (e.g., when an accelerator pedal is released during vehicle stopping or vehicle decelerating). However, this may result in not only reducing fuel economy performance of the vehicle but also unnecessarily increasing carbon dioxide emission which could be a cause of global warming, since the fuel might be consumed wastefully.

Thereupon, many kinds of so-called idling stop engines have been proposed recently. The idling stop engine might stop automatically by stopping a fuel supply into the engine when there is no need to produce the driving power, and then restart automatically by restarting the fuel supply into the engine when there happens to be need to produce the driving power again.

For example, Japanese Unexamined Patent Application Publication No. 2004-108327 discloses an idling stop engine, which restarts the fuel supply when an engine rotating speed reaches a predetermined rotating speed due to a motor (driving motor) for rotating the engine in the case of restarting the engine after automatically stopping the engine. However, even if the engine rotating speed reaches the predetermined rotating speed, the vehicle might not necessarily be in a state requiring a restart of the fuel supply (e.g., in a state requiring vehicle starting or vehicle accelerating). Accordingly, in these known idling stop engines, the fuel might be supplied too early when there is still no need to supply the fuel into the engine, which disadvantageously might not improve the fuel economy performance (which was expected to be improved by automatically stopping the engine).

This invention is made so as to address the above problem. Therefore, the purpose of the invention is to provide an engine control method and an engine control device which could reduce or prevent the unnecessary fuel consumption by restarting the engine at a suitable timing where the fuel supply should be restarted after automatically stopping the engine.

SUMMARY

To achieve the above purpose, in accordance with an aspect of the invention, a control method for an engine (i.e., idling stop engine) having an automatic stopping function, wherein the engine is automatically stopped when a predetermined engine stopping condition is satisfied, and then the engine is automatically restarted when a predetermined engine restarting condition is satisfied, comprising:

a first step for driving a motor so as to increase an engine rotating speed of the engine up to a predetermined rotating speed and maintain the engine rotating speed, in a case in which a predetermined first condition is satisfied when the engine rotating speed is below the predetermined rotating speed (including when the engine stops rotating) during automatic engine stopping; and a second step for restarting a fuel supply into the engine (and a fuel combustion) in a case in which a predetermined second condition is satisfied after the first step is executed.

In the preferable control method for the engine according to the invention, the first condition might be that a brake depressing quantity (or a brake depressing force) by a driver decreases below a predetermined quantity (or a predetermined force) and the second condition might be that an accelerator depressing quantity (or an accelerator depressing force) increases above a predetermined quantity (or a predetermined force), in a case in which an automatic transmission is operatively connected with an output shaft of the engine. In another preferable control method for the engine according to the invention, the first condition might be that a driver's operation regarding shift change of a manual transmission is detected and the second condition might be that an accelerator depressing quantity (or an accelerator depressing force) increases above a predetermined quantity (or a predetermined force), in a case in which the manual transmission is operatively connected with an output shaft of the engine through a clutch.

In the preferable control method for the engine according to the invention, the fuel supply into the engine might be restarted even if a predetermined second condition is not satisfied, when a predetermined time passes after the first condition is satisfied. Also preferably, the motor might stop driving when the second condition is satisfied.

In accordance with another aspect of the invention, a control device for an engine automatically stops the engine when a predetermined engine stopping condition is satisfied and then automatically restarts the engine when a predetermined engine restarting condition is satisfied. The control device for the engine according to this aspect of the invention comprises:

a fuel controller for controlling a fuel supply into the engine;
a motor operatively connected with the engine, which generates driving power for rotating the engine;
a motor controller for controlling the driving power of the motor; and
an engine rotating speed sensor for detecting an engine rotating speed of the engine.

The motor controller increases the engine rotating speed up to a predetermined rotating speed and maintains the engine rotating speed, in the case a predetermined first condition is satisfied when the engine rotating speed is below the predetermined rotating speed during automatic engine stopping. And the fuel controller controls restart of the fuel supply in a case in which a predetermined second condition is satisfied after the engine rotating speed is increased up to the predetermined rotating speed.

According to the control method and control device for the engine of the invention, an automatic stopping period of the engine could be extended until just before the vehicle starting or the vehicle accelerating because the motor could maintain the engine rotating speed, in the case of restarting the engine from automatically stopping the engine. Therefore, both maintaining responsiveness of the engine restarting and improving the fuel economy performance could be satisfied. Accordingly, the engine control method and the engine control device could reduce or prevent the unnecessary fuel consumption by restarting the engine at a suitable timing where the fuel supply should be restarted after automatically stopping the engine.

Further, the above effect could become more remarkable by setting the first condition based on the brake depression quantity and by setting the second condition based on the accelerator depressing quantity in the case the vehicle has an automatic transmission. Still further, the above effect could also become more remarkable by setting the first condition based on the driver's operation regarding the shift change of the manual transmission and by setting the second condition based on the accelerator depressing quantity in the case that the vehicle has a manual transmission.

DESCRIPTION OF EMBODIMENT

Figure 1:
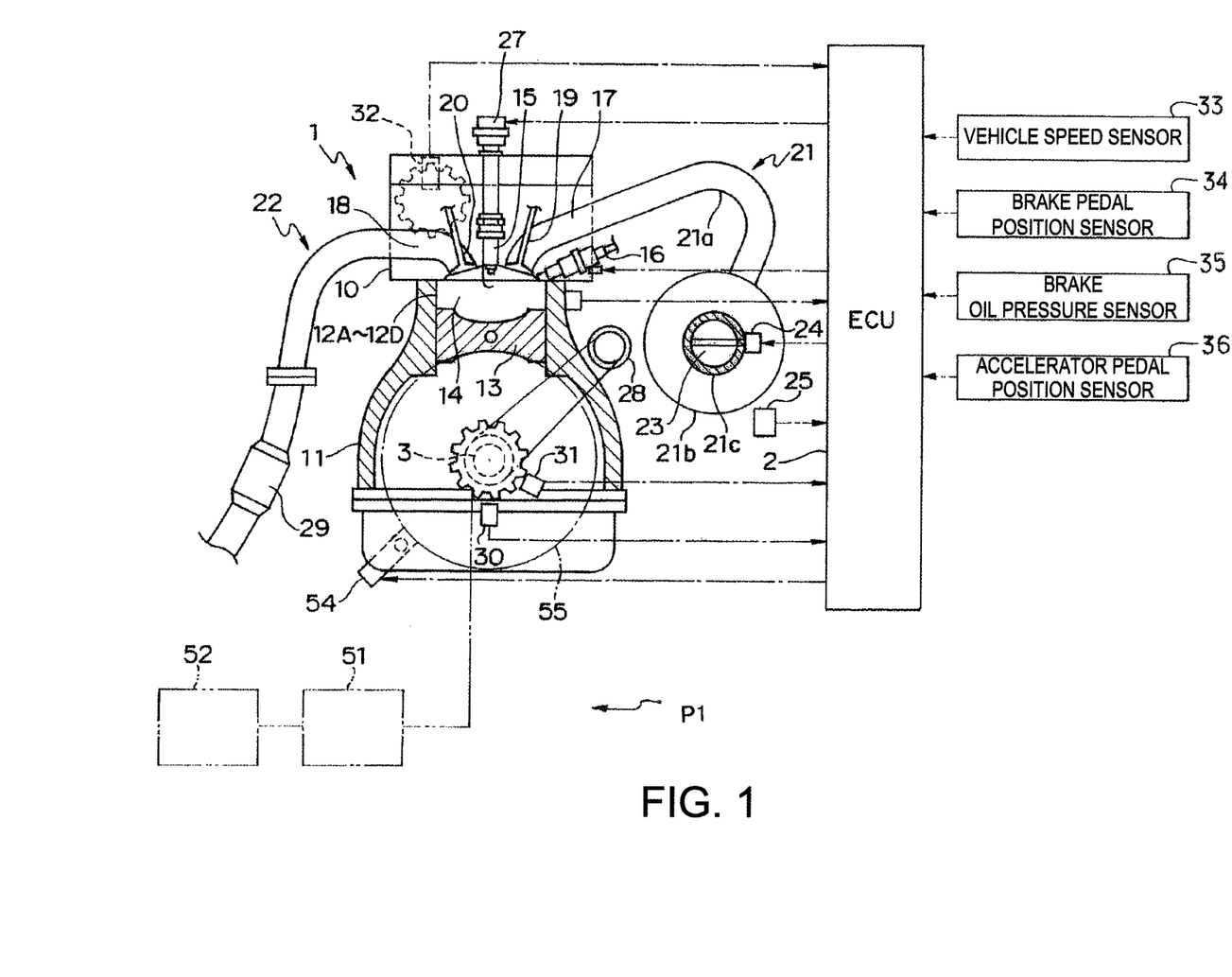
FIG. 1 is a schematic diagram showing a system configuration of a power plant according to Embodiment 1 of the invention provided with an engine and an automatic transmission.
Figure 6:
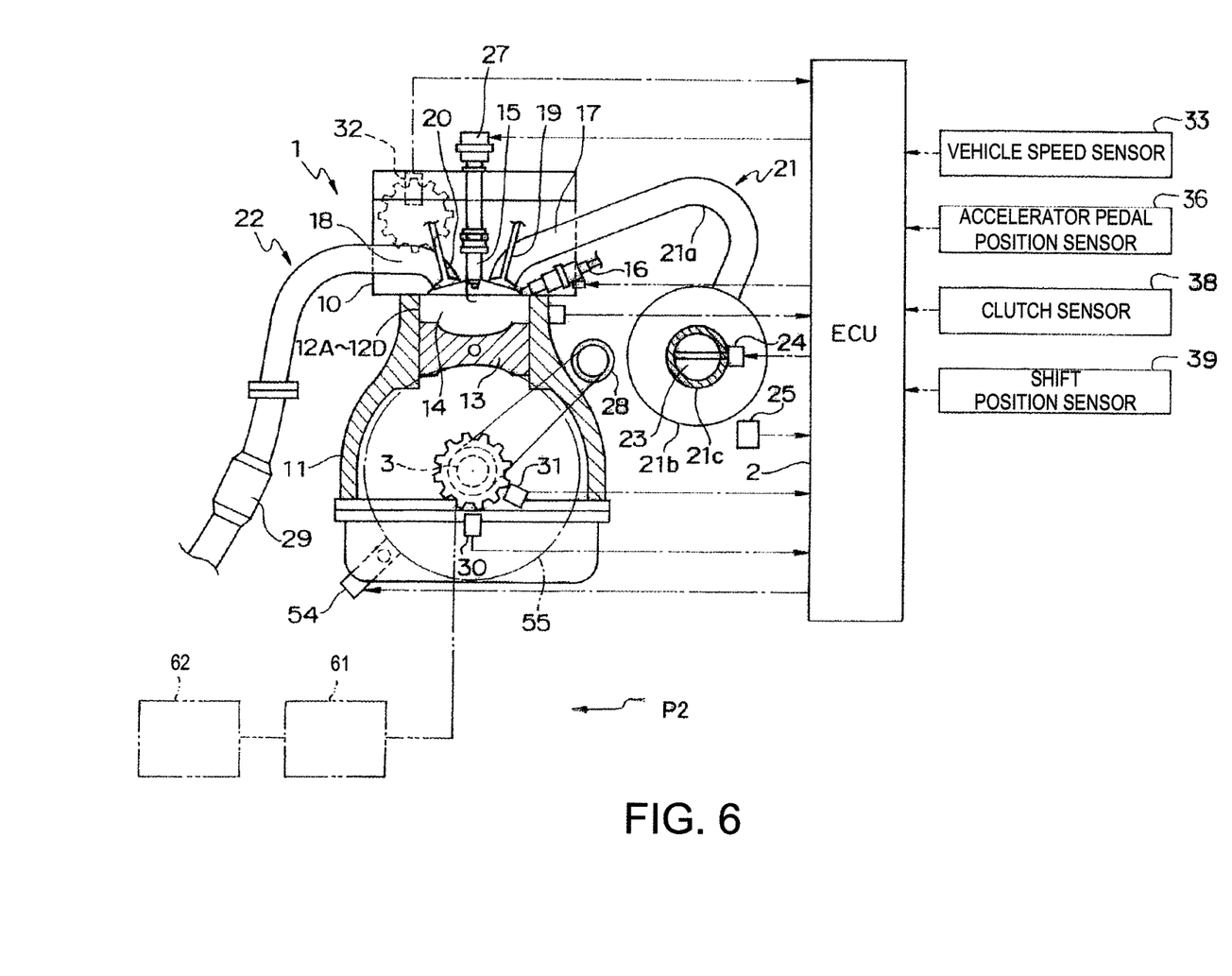
FIG. 6 is a schematic diagram showing a system configuration of a power plant according to Embodiment 2 of the invention provided with an engine and a manual transmission.

Hereinafter, Embodiments 1 and 2 of the invention are described in detail referring to the appended drawings. Embodiment 1 is directed to an automobile (automatic transmission or A/T vehicle) driven by a power plant provided with an automatic transmission, as shown in FIG. 1. Embodiment 2 is directed to an automobile (manual transmission or M/T vehicle) driven by another power plant provided with a manual transmission, as shown in FIG. 6. Although an engine equipped by each automobile is particularly a jump-spark-ignition type engine in Embodiments 1 and 2, the invention may also be applied to an automobile provided with a diesel engine.

(Embodiment 1)

Figure 2:
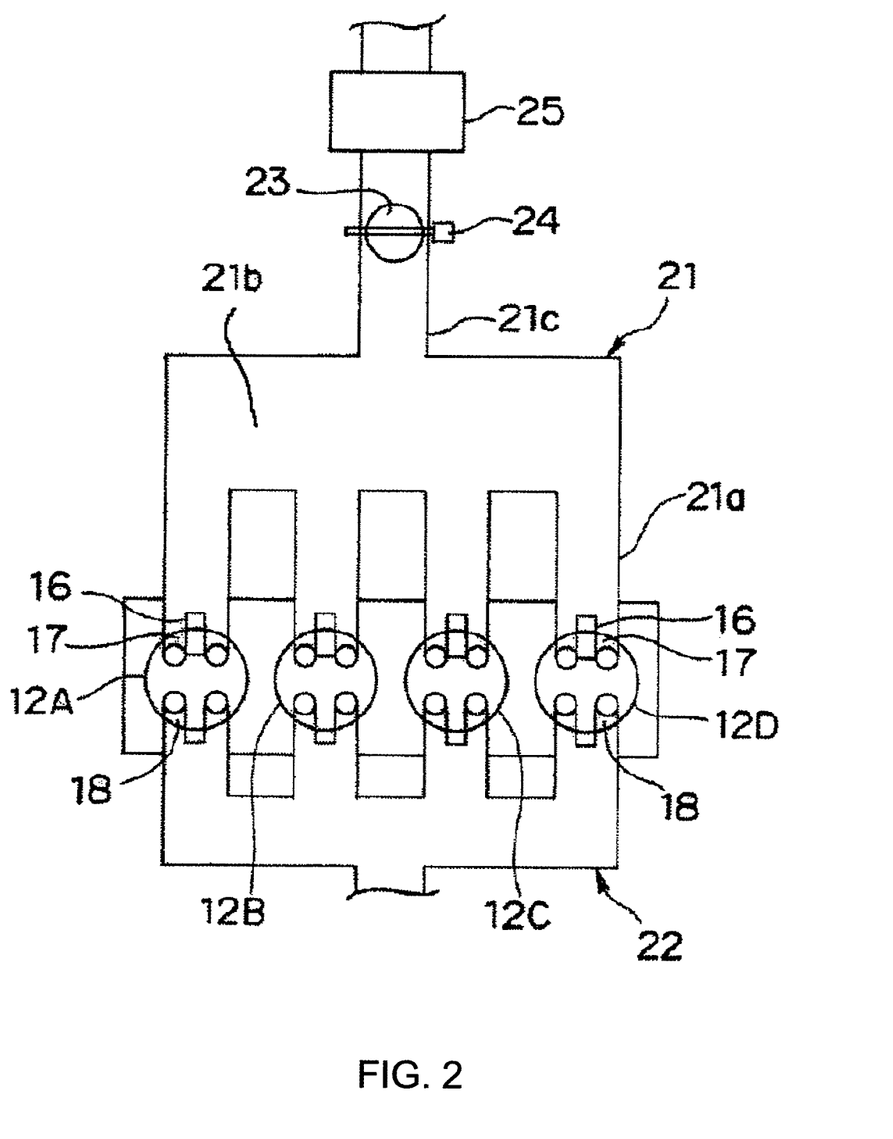
FIG. 2 is a schematic diagram showing a configuration of an intake system and an exhaust system of the engine of FIG. 1.

Hereinafter, Embodiment 1 of the invention is described in more detail referring to FIGS. 1 to 5. As shown in FIGS. 1 and 2, an engine 1 which is a jump-spark-ignition four-cylinder four-cycle engine is provided to a power plant P1 of the automobile according to Embodiment 1. This engine 1 is an idling stop engine provided with an automatic engine stopping function which is controlled by an engine controller 2 (hereinafter, referred to as "ECU 2"), where, when the engine 1 is in operation or the engine 1 combusts fuel to generate its output power (driving power), the engine is automatically stopped if predetermined engine stopping conditions are satisfied, and after that, predetermined engine restarting conditions are satisfied, the engine is automatically restarted.

The engine 1 is provided with a cylinder head 10 and a cylinder block 11 arranged below the cylinder head 10, which form an outer shell of the engine. Inside the cylinder block 11, first to fourth cylinders 12A-12D are provided. Inside each of the first to fourth cylinders 12A-12D, a piston 13 coupled to a common crankshaft 3 via a connecting mechanism such as a connecting rod (not illustrated) is fitted. A combustion chamber 14 is provided above each piston 13.

In the engine 1, the first to fourth cylinders 12A-12D repeat a combustion cycle constituted with intake, compression, expansion, and exhaust strokes with a predetermined phase difference between the cylinders. Combustions in these cylinders are performed with the phase differences of 180 degrees by a crank angle in an order of the first cylinder 12A, the third cylinder 12C, the fourth cylinder 12D, and the second cylinder 12B. Power or torque (output torque) generated by the engine 1 is transmitted to an automatic transmission 52 via a torque converter 51 coupled to the crankshaft 3. Power or torque outputted from the automatic transmission 52 is transmitted to driving wheels (not illustrated) of the automobile.

The first to fourth cylinders 12A-12D are fundamentally provided with the same structure and the same function. Therefore, the structure and function are described below only taking one cylinder as an example. In each of the cylinders 12A-12D, a spark plug 15 for igniting and combusting air fuel mixture in the combustion chamber 14 is provided at a top part of the combustion chamber 14. The spark plug 15 is arranged so that electrodes at the tip thereof face the combustion chamber 14. A fuel injection valve 16 is arranged in a side part of the combustion chamber 14 (right-hand side in FIG. 1) so that an injection hole at the tip thereof faces the combustion chamber 14.

Although the fuel injection valve 16 is not illustrated in detail, a needle valve and a solenoid are built therein, and the injection valve 16 is opened for a period of time corresponding to a pulse width of a pulse signal from the ECU 2 to directly inject an amount of fuel corresponding to the opened period of time into the combustion chamber 14. The fuel injection valve 16 is adjusted so that a direction of the fuel injection is oriented toward a region near the electrodes of the spark plug 15. Although not illustrated, the fuel is supplied to the fuel injection valve 16 via a fuel feed passage by a fuel pump. A pressure of the fuel supply by the fuel injection valve 16 is set higher than a pressure inside the combustion chamber 14 so that the fuel is injected into the high-pressure combustion chamber 14 after a middle stage of a compression stroke.

An intake port 17 and an exhaust port 18 are provided in an upper part of the combustion chamber 14 so as to open to the combustion chamber 14 for each cylinder. An intake valve 19 and an exhaust valve 20 are arranged in the intake port 17 and the exhaust port 18, respectively. The intake valve 19 and the exhaust valve 20 are driven by a valve operating mechanism (not illustrated) provided with a camshaft. The valve operating mechanism opens and closes the intake valves 19 and the exhaust valves 20 of the respective cylinders 12A-12D so that the first to fourth cylinders 12A-12D perform combustion cycles with the predetermined phase difference therebetween.

Hereinafter, an intake system and an exhaust system of the engine 1 are described. The engine 1 is provided with an intake passage 21 and an exhaust passage 22 which communicate with the intake port 17 and the exhaust port 18, respectively. As shown in FIG. 2, a downstream part of the intake passage 21 near the intake port 17 is made into independent branched intake passages 21a for the respective cylinders 12A-12D, and an upstream end of each branched intake passage 21a communicates with a surge tank 21b. A part of the intake passage 21 upstream of the surge tank 21b is a common intake passage 21c which is common to the cylinders 12A-12D. In the common intake passage 21c, a throttle valve 23 for adjusting a cross-sectional area of the passage for example by a butterfly valve and choking a flow of intake air, and an actuator 24 for driving the throttle valve 23 are arranged. An airflow sensor 25 for detecting an amount of intake air is disposed upstream of the throttle valve 23.

Returning to FIG. 1, a catalytic converter 29 for purifying exhaust gas is disposed downstream of the collected part of the exhaust passage 22 where exhaust gases from the first to fourth cylinders 12A-12D gather. In this embodiment, a three-way catalyst is used for the catalytic converter 29 as an exhaust emission control catalyst. However, the exhaust emission control catalyst is not limited to the three-way catalyst described above, and other exhaust emission control catalysts, such as a lean $NO_x$ catalyst, may also be used, for example.

An alternator 28 which is rotated by the crankshaft 3 via a belt is provided to the engine 1. Electric power generated by the alternator 28 is stored in a battery 80 (refer to FIG. 3) described later. A starter motor 54, which starts the engine 1 by rotating the flywheel ring gear 55 and the crankshaft 3 with the electric power supplied from the battery 80, is provided to the engine 1.

Two crank angle sensors 30 and 31 for detecting a rotation angle of the crankshaft 3 are provided to the power plant P1. Here, an engine rotating speed is derived mainly based on a signal from the first crank angle sensor 30. A rotating direction and a rotation angle of the crankshaft 3 are detected based on the crank angle signals which are outputted from the two crank angle sensors 30 and 31 with which the phases shifted mutually as shown in FIG. 1.

Further, other than the sensors described above, a cam angle sensor 32, a vehicle speed sensor 33, a brake pedal position sensor 34 (sensor for detecting a depressing quantity or force of a brake pedal), a brake oil pressure sensor 35, and an accelerator pedal position sensor 36 (or sensor for detecting a depressing quantity or force of an accelerator pedal) are provided to the power plant P1.

The cam angle sensor 32 detects a specific rotating position of the camshaft and outputs it as a cylinder discernment signal. The vehicle speed sensor 33 has an electromagnetic pickup (not illustrated) and detects a traveling speed of the automobile (vehicle speed). The brake pedal position sensor 34 detects an operating amount (or force) or a depressing quantity (or force) of the brake pedal (not illustrated). The brake oil pressure sensor 35 detects a brake fluid pressure. The accelerator pedal position sensor 36 detects an operating amount (or force) or a depressing quantity (or force) of the accelerator pedal (not illustrated). Note that the operating or depressing quantity or force of the brake or accelerator pedal is simply referred to as "pedal position" below.

Figure 3:
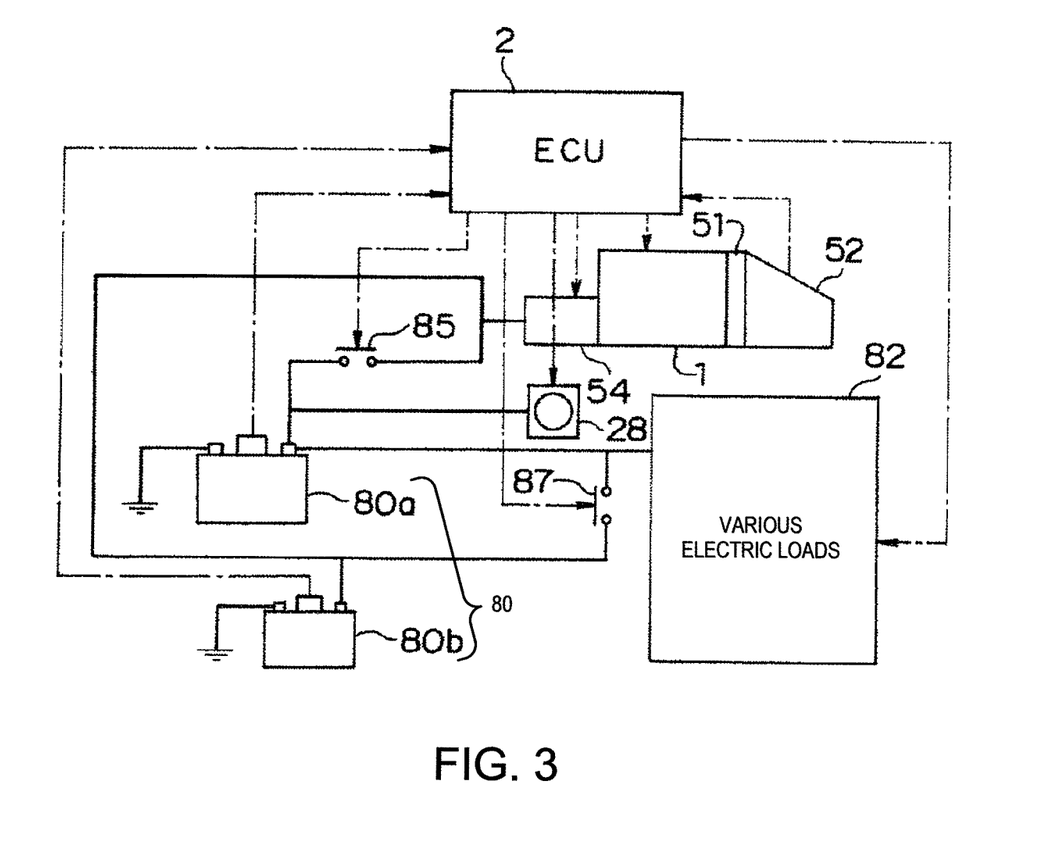
FIG. 3 is a schematic diagram of an electric power supply system of the power plant of FIG. 1.

Hereinafter, an electric power supply system to the power plant P1 is described in detail referring to FIG. 3. As shown in FIG. 3, the electric power supply system of the power plant P1 is provided with the battery 80 including a main battery 80*a* and a sub battery 80*b*. Here, the main battery 80*a* has a relatively larger capacity than that of the sub battery 80*b*. The main battery 80*a* is always connected with various electric loads 82 of the automobile, and mainly performs an electric power supply to the electric loads 82.

Note that the electric loads 82 can generally be classified into the following three categories: (1) general electric loads where a temporary drop of the battery voltage at the time of engine cranking by the starter motor 54 is not desirable, such as an airbag control unit, an electronic-hydraulic power steering control unit, a navigation system, an audio system, and various meters, (2) general electric loads where a problem does not occur in particular even if the battery voltage drops temporarily at the time of engine cranking by the starter motor 54, such as various lights, a defogger, and (3) electric loads inherent to the automobile, such as a hill-holder mechanism, a motor of an electric power steering.

The main battery 80*a* is connected with a starter motor 54 via a power relay 85. ON/OFF of the power relay 85 is controlled by the ECU 2. When the power relay 85 is OFF, electric power is not supplied to the starter motor 54 from the main battery 80*a*, and on the other hand, when the power relay 85 is ON, the electric power supply from the main battery 80*a* to the starter motor 54 is permitted. Thus, the power relay 85 functions to switch ON/OFF the electric power supply from the main battery 80*a* to the starter motor 54. In addition, the main battery 80*a* is always connected with the alternator 28, and the electric power generated by the alternator 28 is stored in the main battery 80*a*.

The sub battery 80*b* has a relatively smaller capacity than the main battery 80*a*, and is used as a battery dedicated to driving of the starter motor 54. The sub battery 80*b* is always connected with the starter motor 54, and is able to supply electric power to the starter motor 54. The sub battery 80*b* is also connected with the alternator 28 or the main battery 80*a* via a charge relay 87. ON/OFF of the charge relay 87 is controlled by the ECU 2. When the charge relay 87 is ON, electric power generated by the alternator 28 is also stored in the sub battery 80*b*.

The main battery 80*a* and the sub battery 80*b* are connected with the ECU 2. The ECU 2 determines a degradation state of each of the batteries 80*a* and 80*b* based on their respective battery voltages. According to the degradation state, the ECU 2 controls a power generating amount of the alternator 28, or restarts the engine 1.

In this electric power supply system, when restarting the engine 1 by operating an ignition switch (not illustrated), or when restarting the engine 1 which has been stopped by the automatic stopping, the starter motor 54 cranks the crankshaft 3 to rotate it. At this time, fundamentally, electric power is supplied to the starter motor 54 from the sub battery 80*b*, and the starter motor 54 drives the crankshaft 3. Because power consumption by the starter motor 54 in cranking is comparatively large, the battery voltage of the sub battery 80*b* drops greatly temporarily. However, the electric loads 82 have received the electric power supplied from the main battery 80*a*, and it is not influenced by the voltage drop of the sub battery 80*b*. This is especially effective when preventing the voltage drop at the electric load where the battery voltage drop is not particularly desirable, or the electric load inherent to the automobile. When predetermined conditions are satisfied, electric power is supplied to the starter motor 54 from both the sub battery 80*b* and the main battery 80*a*.

The ECU 2 receives the signals from each of the sensors 25 and 30-36, outputs a signal for controlling a fuel injection amount and its injection timing to the fuel injection valve 16. The ECU 2 also outputs a signal for controlling an ignition timing to an ignition device 27 of the spark plug 15, and outputs a signal for controlling a throttle opening to an actuator 24 of the throttle valve 23. When predetermined engine stopping conditions are satisfied while the engine 1 is in operation (idle), the ECU 2 stops the fuel supply to the first to fourth cylinders 12A-12D (fuel cut) to stop the engine 1 automatically without being based on a driver's intention. Then, when predetermined engine restarting conditions are satisfied, the engine 1 is restarted automatically.

Hereinafter, a technique of the engine control according to Embodiment 1 performed by the ECU 2 is described in more detail. In this control, the engine 1 is automatically stopped when the predetermined engine stopping conditions are satisfied, and after that, the engine 1 is automatically restarted when the predetermined engine restarting conditions are satisfied. First, the outline of the engine control according to Embodiment 1 is described. In the engine control according to Embodiment 1 performed by the ECU 2, when the engine stopping conditions described in detail later are satisfied, the fuel supply to the engine 1 is stopped while the engine 1 is in operation (i.e., the engine is still generating power by combustion of the fuel), thereby the engine 1 is stopped automatically.

Then, when the engine is in the automatic stopping state, if the brake pedal position decreases below a predetermined value, electric power is supplied to the starter motor 54 from the battery 80 to start the starter motor 54. Then, after the engine rotating speed is raised to a predetermined speed by the starter motor 54, this predetermined speed is maintained. In this state, fuel supply to the engine 1 is still stopped. Then, when the accelerator pedal position increases above a predetermined value, fuel supply to the engine 1 and combustion of the fuel are started by the ECU 2, and the power supply to the starter motor 54 is stopped. However, when a predetermined time passes after the brake pedal position has decreased below the predetermined value, fuel supply to the engine 1 and combustion of the fuel are started, and the power supply from the battery 80 to the starter motor 54 is stopped, similarly as described above, even when the accelerator pedal position is not above the predetermined value.

Figure 4:
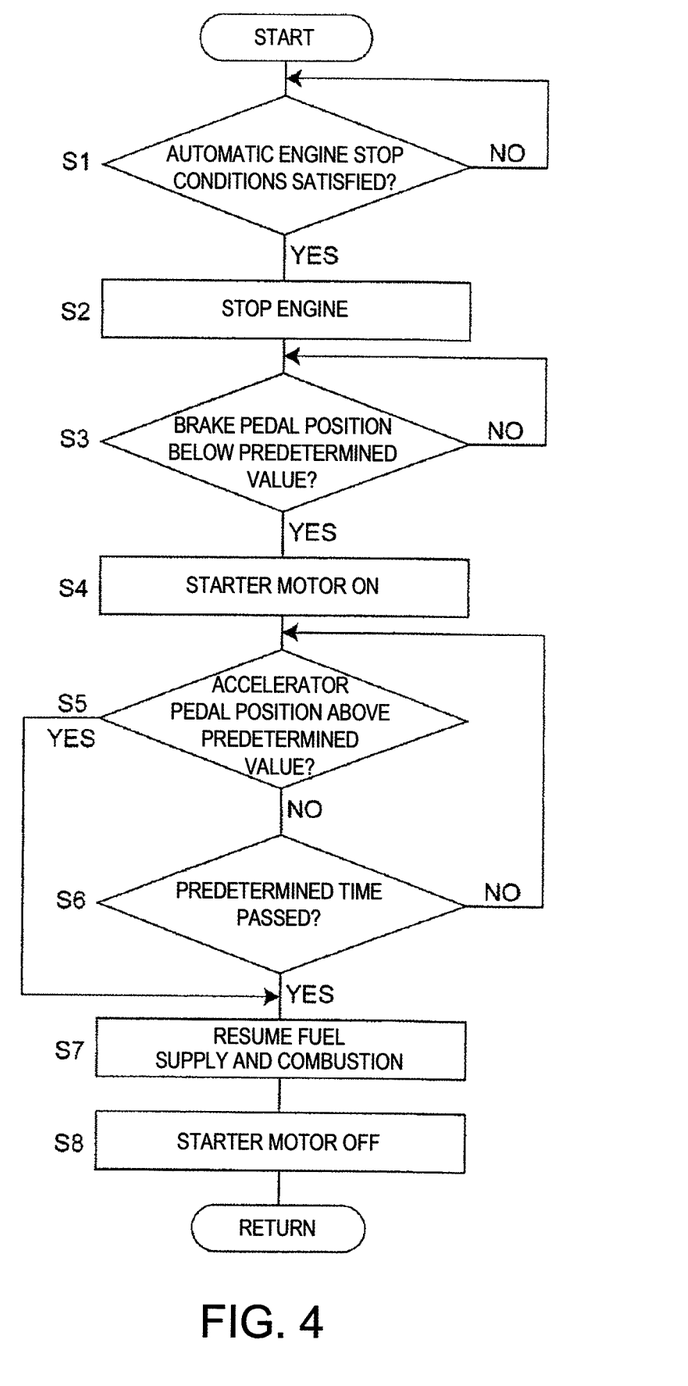
FIG. 4 is a flowchart showing a control technique of an idling stop control in the power plant of FIG. 1.

Next, the technique of the engine control according to Embodiment 1 performed by the ECU 2 is described in more detail referring to a flowchart of FIG. 4. As shown in FIG. 4, when the engine control is started, first at Step S1, the ECU 2 determines whether the engine stopping conditions are satisfied while the engine 1 is in operation. In this engine control, the ECU 2 determines that the engine stopping conditions are satisfied when all the following individual conditions are satisfied. Note that these engine stopping conditions are merely illustration in this embodiment, and, of course, the engine stopping conditions are not limited to these. For example, any of the following individual conditions may be deleted, or a new individual condition or new individual conditions may be added.

<Engine Stop Conditions>
(1) The ignition switch is ON.
(2) The automatic transmission 52 is in the drive (D) range.
(3) The vehicle speed is below the predetermined value (including a vehicle stopping state).
(4) The brake pedal position is above the predetermined value.
(5) The accelerator pedal position is below the predetermined value.

At Step S1, if the ECU 2 determines that the engine stopping conditions are not satisfied (NO), that is, any of the above-described individual conditions is not satisfied, Step S1 is repeatedly performed because the automatic stopping (idling stop) of the engine 1 is not to be performed. Thus, Step S1 is repeatedly performed until the engine stopping conditions are satisfied while the engine 1 is in operation. On the other hand, if the ECU 2 determines that the engine stopping conditions are satisfied at Step S1 (YES), that is, if all the above-described individual conditions are satisfied, the engine 1 is stopped at Step S2. Thus, the fuel injection from the fuel injection valve 16 and the spark discharge by the spark plug 15 are stopped to stop the engine 1.

After the engine 1 is stopped as described above, the ECU 2 determines whether the brake pedal position is below the predetermined value at Step S3. If the ECU 2 determines that the brake pedal position is not below the predetermined value (NO), it repeatedly performs Step S3 because it is not necessary to restart the engine 1 when the driver is depressing the brake pedal. That is, Step S3 is repeatedly performed until the brake pedal position decreases below the predetermined value during the automatic stopping of the engine 1.

On the other hand, if the ECU 2 determines that the brake pedal position is below the predetermined value at Step S3 (YES), it supplies electric power to the starter motor 54 from the battery 80 at Step S4 to rotate the starter motor 54. This is because there is a high possibility that the driver has released or is about to release the depressed brake pedal, therefore the driver starts the automobile (from the automobile being stopped), or accelerates the automobile (while slowing down the automobile). At this time, the starter motor 54 raises the engine rotating speed to a predetermined speed, and maintains this speed. This engine rotating speed is set such that the engine 1 is able to rotate by itself if the fuel supply and combustion of the fuel are resumed (for example, a suitable value within a range of 300 to 500 r.p.m.).

In this state, there is a high possibility that the driver has an intention to start or accelerate the automobile because he/she has released or is about to release the depressed brake pedal. However, it cannot be concluded that the driver is going to start or accelerate the automobile only by this driver's operation alone. For this reason, although rotation of the crankshaft 3 (cranking) is started by the starter motor 54, fuel supply to the engine 1 is not performed. That is, in this state, the crankshaft 3 is made in a rotating state, and if the fuel is supplied and combusted, the engine rotating speed will go up quickly to a speed required for the start or acceleration of the automobile.

Therefore, when the crankshaft 3 is rotated by the starter motor 54 as described above, the ECU 2 then determines at Step S5 whether the accelerator pedal position is above the predetermined value. If the ECU 2 determines that the accelerator pedal position is above the predetermined value (YES), that is, if the driver is depressing the accelerator pedal, it is certain that the driver has an intention to start or accelerate the automobile. Therefore, the fuel supply to the engine 1 and combustion of the fuel are resumed at Step S7. That is, the fuel injection from the fuel injection valve 16 and the spark discharge by the spark plug 15 are resumed to operate the engine 1. Then, the power supply from the battery 80 to the starter motor 54 is stopped at Step S8 to stop the starter motor 54. Note that the order of performing Steps S7 and S8 may be reversed. Next, the ECU 2 returns to Step S1 (return).

On the other hand, if the ECU 2 determines that the accelerator pedal position is not above the predetermined value at Step S5 (NO), that is, if the driver is not depressing the accelerator pedal, the ECU 2 then determines at Step S6 whether a predetermined time has passed after the starter motor 54 is started. After starting the starter motor 54, if the motor rotation is simply continued, there is a possibility of the burden of the battery 80 becoming large and causing exhaustion of the battery 80. Therefore, in this engine control, when the predetermined time passed, the fuel injection from the fuel injection valve 16 is resumed and the starter motor 54 is stopped to restart the engine 1. This predetermined time is set such that the burden of the battery 80 can be suppressed within its tolerable level (for example, a suitable value within a range of 5 to 10 seconds).

On the other hand, if the ECU 2 determines at Step S6 that the predetermined time has not passed after the starter motor 54 is started (NO), it again performs Step S5. On the other hand, if the ECU 2 determines at Step S6 that the predetermined time has passed after the starter motor 54 is started (YES), it resumes the fuel supply to the engine 1 and combustion of the fuel at Step S7, then stops the power supply from the battery 80 to the starter motor 54 at Step S8, and then, the ECU 2 returns to Step S1 (return).

Figure 5:
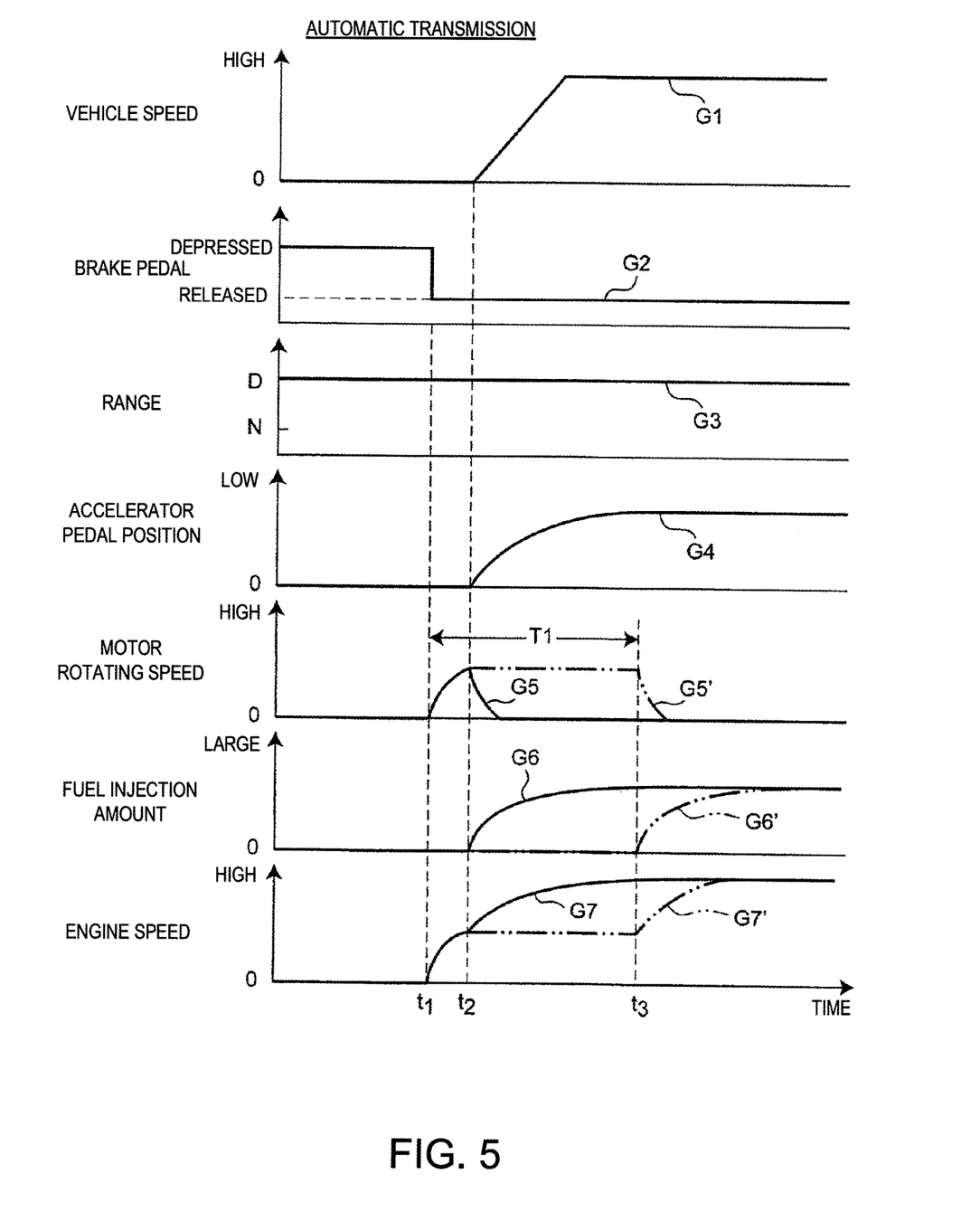
FIG. 5 is a graph showing a temporal change of an operating state of the power plant or an automobile which equips the power plant when performing the idling stop control of FIG. 4.

FIG. 5 shows, in the case of performing the engine control of Embodiment 1 according to the flowchart of FIG. 4, an example of a temporal change in the operating state of the automobile or the power plant P1 when restarting the engine 1 to start the automobile from its stopping state. Specifically, the graphs show change characteristics over time of a vehicle speed (graph G1), an operating state of the brake pedal (graph G2), a range of the automatic transmission 52 (graph G3), an accelerator pedal position (graph G4), a rotating speed of the starter motor 54 (graphs G5, G5'), a fuel injection amount of the fuel injection valve 16 (graphs G6, G6'), and an engine rotating speed (graph G7, G7').

In the example shown in FIG. 5, before a time t1, the driver depresses the brake pedal, and then releases his/her leg from the brake pedal at the time t1 (graph G2). Further, before a time t2, the driver has released his/her leg from the accelerator pedal, and then starts depressing the accelerator pedal at the time t2 (graph G4). As clear from FIG. 5, if the driver releases his/her leg from the brake pedal at the time t1 (graph G2), the starter motor 54 starts rotating immediately (graph G5), and the engine rotating speed increases in connection with this (G7). Then, if the driver depresses the accelerator pedal at the time t2 (graph G4), the fuel injection is resumed from the fuel injection valve 16 (graph G6), and the ignition by the spark plug 15 is started. Therefore, the engine 1 starts (rotates) by itself (graph G7). Then, the automobile starts moving and the vehicle speed rises promptly (graph G1). The power supply from the battery 80 to the starter motor 54 is stopped at the time t2, thereby the rotating speed of the starter motor 54 drops (graph G5).

As shown by virtual lines (graphs G5', G6', and G7'), after the power supply from the battery 80 to the starter motor 54 is started at the time t1, when a predetermined time period T1 passes (time t3), the fuel injection from the fuel injection valve 16 is resumed even when the driver does not depress the accelerator pedal to stop the starter motor 54.

As described above, according to the engine controlling method or the engine control device according to Embodiment 1 of the invention, upon resuming from the automatic stopping of the engine 1, the automatic stopping period of the engine 1 can be extended just before the start or acceleration of the automobile, while maintaining the engine rotating speed by the starter motor 54. For this reason, both maintenance of a response at the time of re-ignition of the engine 1 and improvement in fuel consumption can be achieved. Therefore, after the engine 1 stops automatically, the engine 1 can be restarted at a suitable timing at which the fuel supply is to be resumed; thereby fuel consumption can be improved.

(Embodiment 2)

Hereinafter, Embodiment 2 of the invention is described referring to FIGS. 6 to 8. The power plant P2 of Embodiment 2 is substantially the same as the power plant P1 of Embodiment 1, except that it is provided with a clutch and a manual transmission instead of the torque converter and the automatic transmission. In addition, the engine control of Embodiment 2 is substantially the same as the engine control of Embodiment 1, except that it is based on a gear shift operation or an operation related to a shift change operation of the manual transmission, rather than based on the brake pedal position, as the condition to start the starter motor upon restarting the engine. Therefore, in order to avoid redundancy of explanation, only differences from Embodiment 1 are mainly described below.

As shown in FIG. 6, in the power plant P2 of Embodiment 2, a manual transmission 62 is connected with the crankshaft 3 of the engine 1 via a clutch 61. The power plant P2 includes a clutch sensor 38 for detecting whether the clutch 61 is cut or connected (engaged), and a shift position sensor 39 for detecting a gear shift position of the manual transmission 62 (neutral, 1st gear, 2nd gear, 3rd gear, 4th gear, reverse, etc.). However, the power plant P2 of Embodiment 2 is not provided with the brake pedal position sensor and the brake oil pressure sensor; however, of course, it may also be possible to be provided with the brake pedal position sensor and the brake oil pressure sensor. An intake system and an exhaust system of Embodiment 2 are substantially the same as the intake system and the exhaust system of Embodiment 1 which are shown in FIG. 2. Further, an electric power supply system of Embodiment 2 is substantially the same as the electric power supply system of Embodiment 1 shown in FIG. 3.

Hereinafter, a technique of an engine control according to Embodiment 2 performed by the ECU 2 is described in detail, where, when predetermined engine stopping conditions are satisfied, the engine 1 is stopped automatically, and after that, when predetermined engine restarting conditions are satisfied, the engine 1 is restarted automatically. First, the outline of the engine control of Embodiment 2 is described. In this engine control, when the engine stopping conditions described in detail later are satisfied while the engine 1 is in operation, fuel supply to the engine 1 is stopped to stop the engine 1 automatically.

Then, during the engine automatic stopping, when an operation related to the shift change of the manual transmission is detected, electric power is supplied to the starter motor 54 from the battery 80 to activate the starter motor 54. Then, the engine rotating speed is raised to a predetermined speed by the starter motor 54, and this predetermined speed is maintained. In this state, the fuel supply to the engine 1 is still stopped. After that, when the accelerator pedal position increases above a predetermined value, the ECU 2 starts the fuel supply to the engine 1 and combustion of the fuel, and stops the power supply to the starter motor 54. However, when a predetermined time passes after the detection of the operation related to the shift change of the manual transmission, the fuel supply to the engine 1 and combustion of the fuel are started, and the power supply from the battery 80 to the starter motor 54 is stopped even when the accelerator pedal position is not above the predetermined value.

Figure 7:
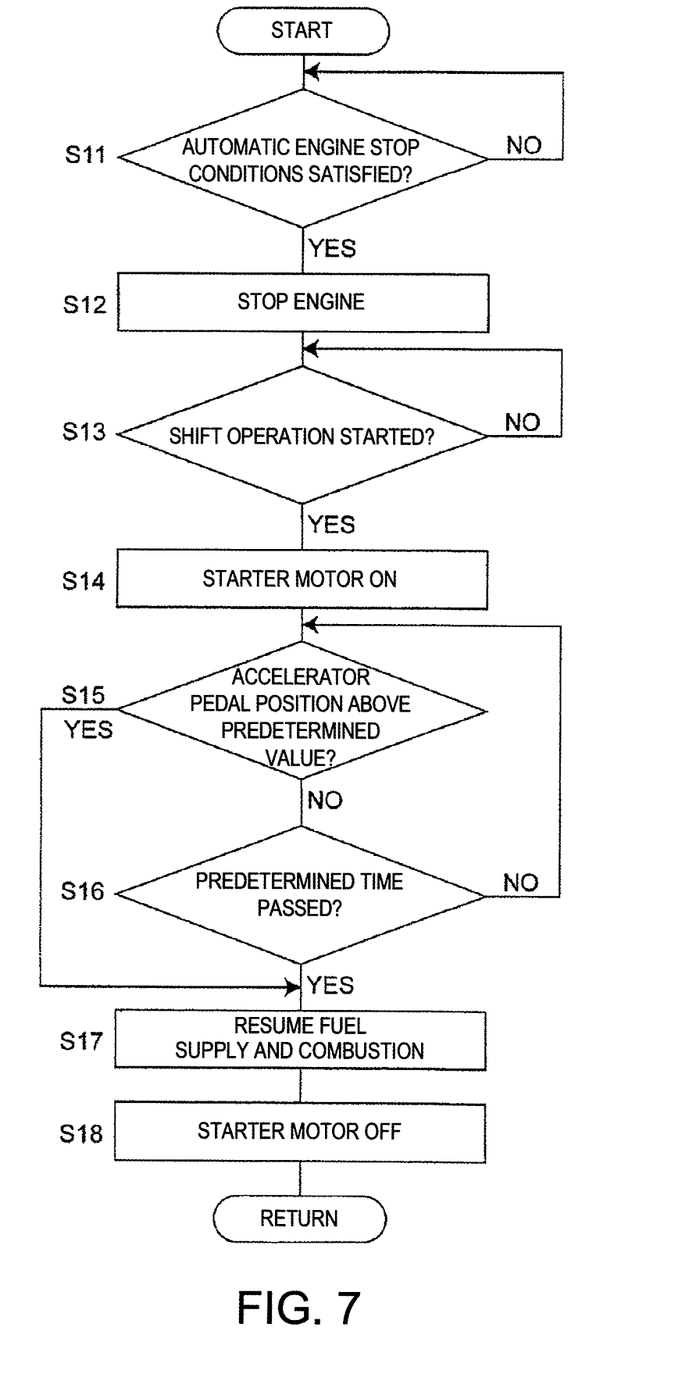
FIG. 7 is a flowchart showing a control technique of an idling stop control in the power plant of FIG. 6.

Next, the engine control technique of Embodiment 2 performed by the ECU 2 is described in more detail referring to a flowchart of FIG. 7. As shown in FIG. 7, when the engine control is started, the ECU 2 first determines at Step S11 whether the engine stopping conditions are satisfied while the engine 1 is in operation. In this engine control, the ECU 2 determines that the engine stopping conditions are satisfied when all the following individual conditions are satisfied. Note that the engine stopping conditions are merely illustration, and, of course, the engine stopping conditions of the engine control according to this embodiment are not limited to these. For example, any of the following individual conditions may be deleted, and a new individual condition or new individual conditions may be added.

<Engine Stop Conditions>

(6) The ignition switch is ON.
(7) The shift position of the manual transmission is neutral (N).
(8) The vehicle peed is below the predetermined value (including a vehicle stopping state).
(9) The accelerator pedal position is below the predetermined value.

At Step S11, if the ECU 2 determines that the engine stopping conditions are not satisfied (NO), that is, any of the above-described individual conditions is not satisfied, it repeats Step S11 because the engine 1 is not to be automatically stopped. In other words, Step S11 is repeatedly performed until the engine stopping conditions are satisfied while the engine 1 is in operation. On the other hand, if the ECU 2 determines that the engine stopping conditions are satisfied at Step S11 (YES), that is, if all the individual conditions are satisfied, it stops the engine 1 at Step S12. In other words, the ECU 2 stops the fuel injection from the fuel injection valve 16 and stops the spark discharge by the spark plug 15 to stop the engine 1.

After the engine 1 is stopped as described above, the ECU 2 then determines at Step S13 whether the shift operation is started. Here, if the ECU 2 determines that the shift operation is not started (NO), that is, the driver leaves the manual transmission 62 in the neutral state, the ECU 2 repeats Step S13 because it is not necessary to restart the engine 1. That is, Step S13 is repeatedly performed until the shift operation is started during the automatic stopping of the engine 1.

On the other hand, if the ECU 2 determines at Step S13 that the shift operation is started (YES), because the driver has switched the shift position of the manual transmission 62 from the neutral position to a shift position where the automobile can travel (for example, at 1st gear), and therefore, the automobile is in a state where it can start moving if the driver connects the clutch 61, the ECU 2 then supplies electric power to the starter motor 54 from the battery 80 at Step S14, to rotate the starter motor 54. At this time, the engine rotating speed is raised to a predetermined speed, and this engine rotating speed is maintained. Note that this engine rotating speed is set such that the engine 1 is able to rotate by itself immediately if the fuel supply and combustion of the fuel are resumed (for example, a suitable value within a range of 300 to 500 r.p.m.).

In this state, although the automobile is in the state where it can start moving only if the driver connects the clutch 61, it cannot be concluded that the driver has an intention to start the automobile immediately only by this state. For this reason, although rotation of the crankshaft 3 (cranking) is started by the starter motor 54, fuel supply to the engine 1 is not performed. That is, because the crankshaft 3 enters the rotating state, if the fuel is supplied and combusted, the engine rotating speed will go up quickly to a speed required for start or acceleration of the automobile.

Then, while the crankshaft 3 is rotated by the starter motor 54 as described above, the ECU 2 determines at Step S15 whether the accelerator pedal position is above the predetermined value. If the ECU 2 determines that the accelerator pedal position is above the predetermined value (YES), that is, when the driver has depressed the accelerator pedal, it is certain that the driver has an intention to start the automobile. Therefore, the fuel supply to the engine 1 and combustion of the fuel are resumed at Step S17. That is, the fuel injection from the fuel injection valve 16 is resumed and the spark discharge by the spark plug 15 is resumed to operate the engine 1. Then, the power supply from the battery 80 to the starter motor 54 is stopped at Step S18 to stop the starter motor 54. Then, the ECU 2 returns to Step S11 (return).

As described above, at Step S15, the ECU 2 determines whether the fuel supply to the engine 1 and combustion of the fuel are to be resumed by whether the accelerator pedal position (or the accelerator pedal depression force) is above the predetermined value. However, without doing this, the same determination may be made by whether a shift operation of the manual transmission 62 is finished.

On the other hand, if the ECU 2 determines at Step S15 that the accelerator pedal position is not above the predetermined value (NO), that is, when the driver does not depress the accelerator pedal, the ECU 2 then determines at Step S16 whether a predetermined time (for example, a suitable value within a range of 5 to 10 seconds) has passed after the starter motor 54 is activated, for similar reason to Embodiment 1. Then, if the ECU 2 determines at Step S16 that the predetermined time has not passed after the starter motor 54 is activated (NO), it again performs Step S15. On the other hand, if the ECU 2 determines at Step S16 that the predetermined time has passed after the starter motor 54 is activated (YES), the fuel supply to the engine 1 and combustion of the fuel are resumed at Step S17, and after that, the power supply from the battery 80 to the starter motor 54 is stopped at Step S18 to stop the starter motor 54, and then, the ECU 2 returns to Step S11 (return).

Figure 8:
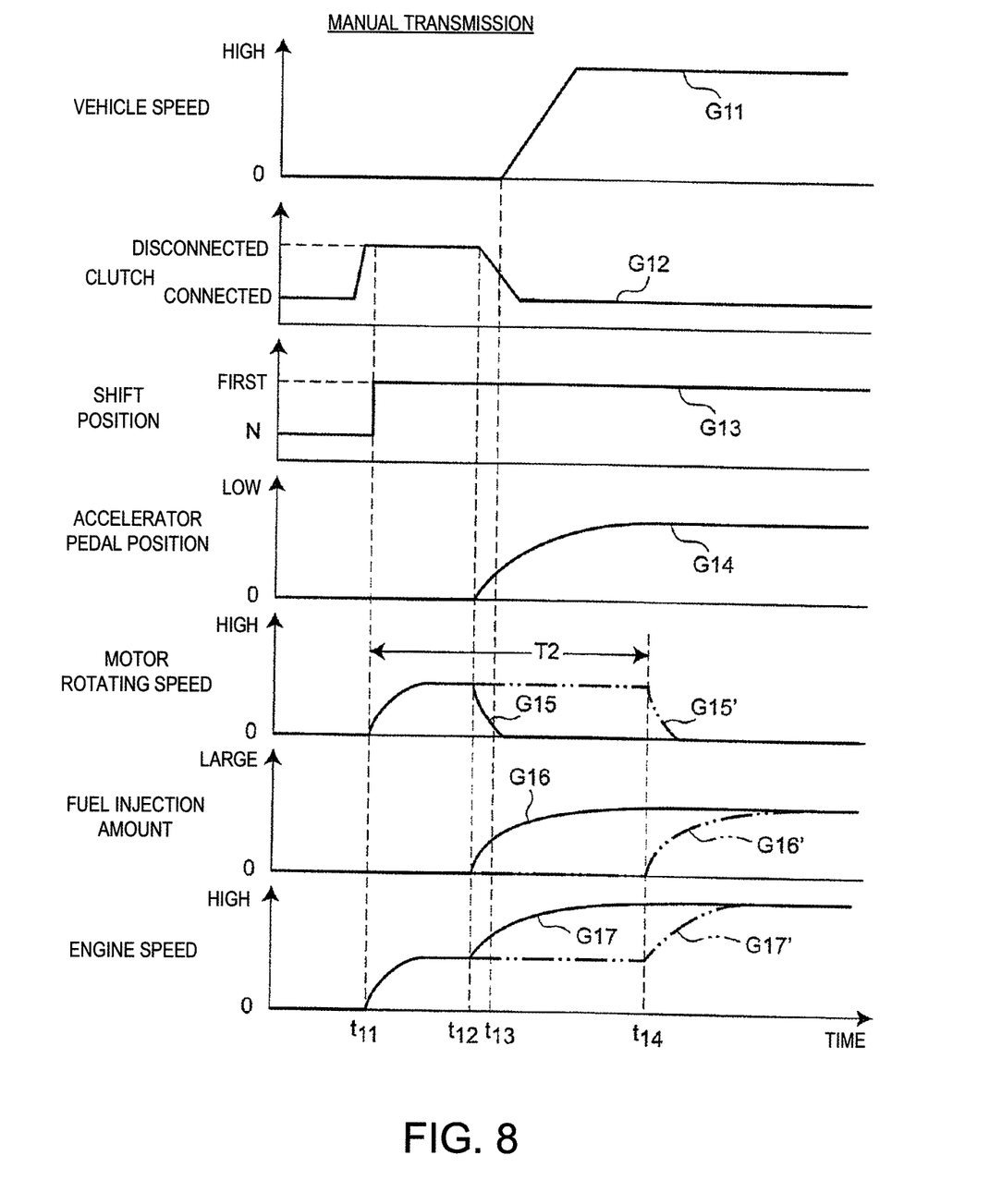
FIG. 8 is a graph showing a temporal change of an operating state of the power plant or an automobile which equips the power plant when performing the idling stop control of FIG. 7.

FIG. 8 shows an example of a temporal change in the operating state of the automobile or the power plant P2 in a case of performing the engine control of Embodiment 2 according to the flowchart shown in FIG. 7 when starting the automobile by restarting the engine 1 while the automobile is stopped. Specifically, the graphs show change characteristics over time of a vehicle speed (graph G11), an operating state of the clutch 61 (graph G12), a shift position of the manual transmission 62 (graph G13), an accelerator pedal position (graph G14), a rotating speed of the starter motor 54 (graphs G15, G15'), a fuel injection amount of the fuel injection valve 16 (graphs G16, G16'), and an engine rotating speed (graphs G17, G17').

In the example shown in FIG. 8, the driver depresses a clutch pedal slightly before a time t11 to cut the clutch 61, and at the time t11, he/she operates a shift lever to switch the shift position from neutral to 1st gear. Then, the driver starts releasing the clutch pedal at a time t12 to start connecting the clutch 61. As a result, the clutch 61 enters a half-connected state (half-clutch state) at a time t13, and shortly after that, the clutch 61 is completely connected. As clear from FIG. 8, when the driver switches the shift position from neutral to 1st gear at the time t11 (graph G13), the starter motor 54 starts rotating immediately (graph G15), and the engine rotating speed goes up in connection with this (G17). In this embodiment, although the timing at which the starter motor 54 starts rotating is set at a time at which the shift position is switched from neutral to 1st gear, it may be set at when the clutch 61 is cut or when the clutch pedal is depressed.

Then, at the time t12, the driver begins to release his/her leg from the clutch pedal to start connecting the clutch 61 (graph G12), and when the driver depresses the accelerator pedal (graph G14), the fuel injection from the fuel injection valve 16 is resumed (graph G16), and an ignition by the spark plug 15 is started, thereby the engine 1 starts operating (rotating) by itself (graph G17). Then, when the clutch 61 enters a half-connected state at a time t13, the output power of the engine 1 begins to be transmitted to the manual transmission 62 via the clutch 61, and then to the driving wheels. Thereby, the automobile starts moving, and from this time on, the vehicle speed rises promptly (graph G11). Note that the power supply from the battery 80 to the starter motor 54 is stopped at the time t12 and, thus, the rotating speed of the starter motor 54 drops (graph G15).

As shown by virtual lines (graphs G15', G16', and G17'), after the power supply from the battery 80 to the starter motor 54 is started at the time t11, when a predetermined period of time T2 passed (time t14), the fuel injection from the fuel injection valve 16 is resumed, and the starter motor 54 is stopped, even when the driver does not depress the accelerator pedal.

As described above, also with the method or device for controlling the engine according to Embodiment 2 of the invention, the automatic stopping period of the engine 1 can be extended to immediately before the moving start or acceleration of the automobile while maintaining the engine rotating speed by the starter motor 54 upon resuming from the automatic stopping of the engine 1, similar to Embodiment 1. Therefore, both maintenance of the response at the time of re-ignition of the engine 1 and improvement in fuel consumption can be achieved. Thus, after the engine 1 stops automatically, the engine 1 can be restarted at a suitable timing at which the fuel supply is to be resumed, thereby improving the fuel consumption.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A control device for an engine which automatically stops the engine when a predetermined engine stopping condition is satisfied and then automatically restarts the engine when a predetermined engine restarting condition is satisfied, comprising:
    an engine rotating speed sensor for detecting an engine rotating speed of the engine;
    a motor operatively connected with the engine, which generates a driving power for rotating the engine;
    a motor controller for controlling the driving power of the motor so as to increase the engine rotating speed up to a predetermined rotating speed and maintain the engine rotating speed, in a case in which a predetermined first condition is satisfied when the engine rotating speed is below the predetermined rotating speed during automatic engine stopping; and
    a fuel controller for controlling a fuel supply into the engine so as to restart the fuel supply in a case in which a predetermined second condition is satisfied after the engine rotating speed is increased up to the predetermined rotating speed.

2. A control method for an engine having an automatic stopping function, wherein the engine is automatically stopped when a predetermined engine stopping condition is satisfied, and then the engine is automatically restarted when a predetermined engine restarting condition is satisfied, comprising:
    a first step for driving a motor so as to increase an engine rotating speed of the engine up to a predetermined rotating speed and maintain the engine rotating speed, in a case in which a predetermined first condition is satisfied when the engine rotating speed is below the predetermined rotating speed during automatic engine stopping; and
    a second step for restarting a fuel supply into the engine in a case in which a predetermined second condition is satisfied after the first step is executed.

3. The control method according to claim 2 wherein, an automatic transmission is operatively connected with an output shaft of the engine, the first condition is that a brake depressing quantity decreases below a predetermined quantity, and
the second condition is that an accelerator depressing quantity increases above a predetermined quantity.

4. The control method according to claim 3 wherein, the fuel supply into the engine is restarted even if the predetermined second condition is not satisfied, when a predetermined time passes after the first condition is satisfied.

5. The control method according to claim 4 wherein, the motor stops driving when the predetermined time passes after the first condition is satisfied.

6. The control method according to claim 3 wherein, the predetermined engine stopping condition is that the brake depressing quantity increases above a predetermined quantity, and that the accelerator depressing quantity decreases below a predetermined quantity.

7. The control method according to claim 2 wherein, a manual transmission is operatively connected with an output shaft of the engine through a clutch,
the first condition is that a driver's operation regarding shift change of the manual transmission is detected, and
the second condition is that an accelerator depressing quantity increases above a predetermined quantity.

8. The control method according to claim 7 wherein, the predetermined engine stopping condition is that the driver changes the shift of the manual transmission into neutral is detected, and that an accelerator depressing quantity decreases below a predetermined quantity.

9. The control method according to claim 2 wherein, a manual transmission is connected with an output shaft of the engine through a clutch,
the first condition is that the clutch is disconnected, and
the second condition is that an accelerator depressing quantity increases above a predetermined quantity.

10. The control method according to claim 2 wherein, the fuel supply into the engine is restarted even if the predetermined second condition is not satisfied, when a predetermined time passes after the first condition is satisfied.

11. The control method according to claim 10 wherein, the motor stops driving when a predetermined time passes after the first condition is satisfied.

12. The control method according to claim 2 wherein, the motor stops driving when the second condition is satisfied.

* * * * *